(12) United States Patent
Klatt et al.

(10) Patent No.: US 11,186,235 B2
(45) Date of Patent: Nov. 30, 2021

(54) REMOVABLE TOOL STORAGE COMPARTMENT

(71) Applicant: MAINTAINER CORP. OF IOWA, Sheldon, IA (US)

(72) Inventors: Jason Alan Klatt, Sioux Falls, SD (US); Adam Harrison Besaw, Sheldon, IA (US); Nathan Dan Schiermeyer, Rock Rapids, IA (US)

(73) Assignee: Maintainer Corp. of Iowa, Sheldon, IA (US)

( * ) Notice: Subject to any disclaimer, the term of this patent is extended or adjusted under 35 U.S.C. 154(b) by 0 days.

(21) Appl. No.: 15/929,952

(22) Filed: May 29, 2020

(65) Prior Publication Data
US 2020/0290524 A1    Sep. 17, 2020

Related U.S. Application Data

(63) Continuation-in-part of application No. 16/193,464, filed on Nov. 16, 2018, now Pat. No. 10,676,043.
(Continued)

(51) Int. Cl.
| | |
|---|---|
| *B60R 11/06* | (2006.01) |
| *B60R 9/06* | (2006.01) |
| *E05B 83/18* | (2014.01) |
| *E05B 83/22* | (2014.01) |
| *E05B 41/00* | (2006.01) |

(Continued)

(52) U.S. Cl.
CPC ............... *B60R 11/06* (2013.01); *B60P 3/14* (2013.01); *B60R 9/065* (2013.01); *E05B 1/0053* (2013.01); *E05B 17/0083* (2013.01); *E05B 17/10* (2013.01); *B60R 2011/004* (2013.01); *E05B 41/00* (2013.01); *E05B 83/18* (2013.01); *E05B 83/22* (2013.01); *E05Y 2201/624* (2013.01); *E05Y 2400/44* (2013.01); *E05Y 2900/516* (2013.01); *E05Y 2900/518* (2013.01)

(58) Field of Classification Search
CPC .......... B60R 11/06; B60R 9/02; B60R 9/065; B60R 2011/004; B60P 3/14; B25H 3/00; B25H 3/02; B25H 3/021; E05B 17/0083; E05B 41/00; E05B 83/18; E05B 83/22
USPC ..... 296/37.6; 224/404, 42.4; 410/90, 91, 80, 410/81, 82, 83
See application file for complete search history.

(56) References Cited

U.S. PATENT DOCUMENTS

| | | | | |
|---|---|---|---|---|
| 2,978,153 | A | * | 4/1961 | Brindle ................. B60R 9/02 224/541 |
| 3,047,185 | A | * | 7/1962 | Lewis .................. B65F 1/141 220/630 |

(Continued)

*Primary Examiner* — Justin M Larson
(74) *Attorney, Agent, or Firm* — Dunlap Bennett & Ludwig, PLLC; Brendan E. Squire (57) ABSTRACT

A removable and replaceable tool storage compartment apparatus including tool storage compartments and a compartment receiver. The tool storage compartments each include a frame, a plurality of panels coupled to the frame. A closure is configured to open and close an entrance to an inside of the tool storage compartment. The compartment receiver is configured to secure to a truck and support the tool storage compartment thereon. Lift mounts are coupled to the tool storage compartment and are used to remove the tool storage compartments from the truck. A lock arm is configured to lock the compartment receiver to secure the tool storage compartments to a bay to receive storage compartment to the truck.

17 Claims, 7 Drawing Sheets

Related U.S. Application Data (60) Provisional application No. 62/587,562, filed on Nov. 17, 2017.

(51) Int. Cl.
  *E05B 17/10* (2006.01)
  *B60P 3/14* (2006.01)
  *E05B 1/00* (2006.01)
  *E05B 17/00* (2006.01)
  *B60R 11/00* (2006.01)

(56) References Cited

U.S. PATENT DOCUMENTS

| | | | | |
|---|---|---|---|---|
| 3,602,376 A * | 8/1971 | DePiano | B65D 19/0002 | 248/346.02 |
| 4,126,349 A * | 11/1978 | Nelson | B60R 11/00 | 224/404 |
| 4,249,295 A * | 2/1981 | Lance | B60R 11/06 | 29/416 |
| 4,249,684 A * | 2/1981 | Miller | E05G 1/005 | 224/42.4 |
| 4,274,568 A * | 6/1981 | Bott | B60R 9/065 | 220/629 |
| 4,626,155 A * | 12/1986 | Hlinsky | B60P 7/132 | 114/75 |
| 5,000,502 A * | 3/1991 | Lyall | A62C 27/00 | 296/186.4 |
| 5,381,916 A * | 1/1995 | Strawder | B65D 21/0202 | 220/212 |
| 5,395,019 A * | 3/1995 | Christensen | B60R 11/06 | 224/319 |
| 5,421,645 A * | 6/1995 | Young | B60R 11/06 | 296/37.6 |
| 5,460,304 A * | 10/1995 | Porter | B60R 9/10 | 224/521 |
| 5,617,696 A * | 4/1997 | Young | B60R 11/06 | 52/836 |
| 5,653,366 A * | 8/1997 | Liserre | B60R 7/02 | 220/481 |
| 5,687,895 A * | 11/1997 | Allison | B60R 7/02 | 220/23.4 |
| 6,099,070 A * | 8/2000 | Yocum | B62D 33/042 | 296/182.1 |
| 6,126,131 A * | 10/2000 | Tietz | B25H 3/00 | 108/55.3 |
| 6,176,540 B1 * | 1/2001 | Whittaker | B60J 7/1621 | 296/100.01 |
| 6,375,054 B1 * | 4/2002 | Lance | B60P 3/14 | 224/404 |
| 6,422,629 B2 * | 7/2002 | Lance | B60R 11/00 | 224/403 |
| 6,511,270 B1 * | 1/2003 | Burke | B60P 7/0807 | 410/101 |
| 6,524,040 B1 * | 2/2003 | Heil | B65D 19/0014 | 410/100 |
| 6,554,342 B1 * | 4/2003 | Burnett | B60P 3/14 | 211/70.6 |
| 6,626,480 B2 * | 9/2003 | Anderson | B60P 7/08 | 224/404 |
| 6,742,825 B1 * | 6/2004 | Macaulay | B60R 11/06 | 296/37.6 |
| 6,824,338 B2 * | 11/2004 | Looker | B65D 88/14 | 410/67 |
| 7,070,227 B2 * | 7/2006 | Hunt | B60J 5/0497 | 296/183.1 |
| 7,156,273 B2 * | 1/2007 | Morris | B60R 9/06 | 108/14 |
| 7,258,260 B2 * | 8/2007 | Hurd | B60R 9/055 | 224/319 |
| 7,726,719 B1 * | 6/2010 | Barron | B60R 9/0485 | 296/37.6 |
| 7,794,003 B2 * | 9/2010 | Crandall | B60R 9/00 | 296/37.6 |
| 8,061,572 B2 * | 11/2011 | Myrex | B60R 9/06 | 224/502 |
| 8,083,111 B2 * | 12/2011 | Lase | B60R 11/06 | 224/410 |
| 8,205,773 B2 * | 6/2012 | Timmer | F41H 7/00 | 224/400 |
| 8,387,940 B2 * | 3/2013 | Gros | B63B 29/06 | 248/503 |
| 8,668,209 B1 * | 3/2014 | Anzivino | B62B 1/002 | 280/47.12 |
| 8,820,598 B2 * | 9/2014 | Tennyson | B60R 9/065 | 224/509 |
| 8,960,468 B2 * | 2/2015 | Boivin | B65D 19/42 | 220/4.28 |
| 9,132,543 B2 * | 9/2015 | Bar-Erez | B65D 43/16 | |
| 9,193,290 B2 * | 11/2015 | Lazarevich | B60P 3/14 | |
| 9,216,698 B2 * | 12/2015 | Rhodes | B60R 9/065 | |
| 9,623,550 B2 * | 4/2017 | Cole | A47B 83/045 | |
| 9,656,750 B2 * | 5/2017 | Fischer | B64D 9/00 | |
| 9,724,819 B2 * | 8/2017 | Barry | B25H 3/006 | |
| 9,969,414 B2 * | 5/2018 | Kelly | B62B 5/0093 | |
| 10,676,043 B2 * | 6/2020 | Klatt | B60R 11/00 | |
| 10,744,953 B2 * | 8/2020 | Labbe | B60R 9/065 | |
| 10,760,306 B2 * | 9/2020 | Chapman | E05B 67/38 | |
| 10,800,341 B2 * | 10/2020 | Merryman | B60R 9/065 | |
| 2002/0047032 A1 * | 4/2002 | Schlecht | B60R 7/02 | 224/544 |
| 2008/0170924 A1 * | 7/2008 | Morin | B61D 45/007 | 410/80 |
| 2011/0221222 A1 * | 9/2011 | Ross | B60R 11/06 | 296/37.6 |
| 2012/0267404 A1 * | 10/2012 | Rottinghaus | B60R 11/06 | 224/404 |
| 2014/0123478 A1 * | 5/2014 | Gylander | B25H 3/02 | 29/700 |
| 2019/0152409 A1 * | 5/2019 | Klatt | B60R 11/00 | |
| 2020/0290524 A1 * | 9/2020 | Klatt | E05B 17/10 | |
| 2020/0339040 A1 * | 10/2020 | Labbe | B62M 27/02 | |
| 2020/0346819 A1 * | 11/2020 | Kogel | B65D 21/0223 | |

\* cited by examiner

REMOVABLE TOOL STORAGE COMPARTMENT

CROSS-REFERENCE TO RELATED APPLICATION

This application is a continuation in part (CIP) application of U.S. patent application Ser. No. 16/193,464, filed Nov. 16, 2018 and claims the benefit of priority of U.S. provisional application No. 62/587,562, filed Nov. 17, 2017, the contents of which are herein incorporated by reference.

BACKGROUND OF THE INVENTION

The present invention relates to tool storage compartments and, more particularly, to tool storage compartments that are easily removable from a truck and replaceable.

Service trucks are often assigned to multiple mechanics who each have their own personal tools. At the end of each shift, the personal tools must be replaced on the truck for the next mechanic to use. Removing all the tools from the truck to switch them at the end of the shift is not practical. Leaving them on the vehicle does not allow the mechanic to have access to their tools if the truck is being used elsewhere. Current tool compartments are permanently attached, bolted on, or take significant time to remove.

As can be seen, there is a need for a removable toolbox compartment for mechanics to safely and quickly move their own tools from the truck to a facility location.

SUMMARY OF THE INVENTION

In one aspect of the invention, a removable and replaceable tool storage compartment is disclosed. The removable and replaceable tool storage compartment includes a tool storage compartment having a body and a closure coupled to the body and configured to open and close an entrance to an interior of the tool storage compartment. A compartment receiver is disposed at a bottom of the tool storage compartment and is configured to couple to a lower receiver attachment point mounted within a bay of a service truck dimensioned to contain the tool storage compartment therein.

In some embodiments, the compartment receiver includes a cup dimensioned to receive the lower receiver attachment point. A latch secures the lower receiver attachment point within the cup. A handle is operable to selectively release and secure the latch about the lower receiver attachment point.

In other embodiments, a locking arm is pivotally coupled to the handle to selectively engage the lower receiver in one of a latched or an unlatched condition. The removable and replaceable tool storage may also include casters coupled to a bottom of the tool storage compartment. A plurality of lifting points disposed on a top end of the tool storage compartment.

In other embodiments, the removable and replaceable tool storage also includes a coupling at an aft side of the top end of the tool storage compartment. The coupling is configured to engage with a slotted opening at a top end of the bay to prevent the tool storage compartment from tipping when received within the bay.

In other aspects of the invention, a service vehicle is disclosed. The service vehicle is adapted to receive a removable storage compartment. The service vehicle includes a bay dimensioned to receive the removable storage compartment. A lower receiver attachment point is mounted within a bay. A compartment receiver is attached to a bottom end of the removable storage compartment. The compartment receiver operable to selectively retain the lower receiver attachment point within the receiver.

In other embodiments, the compartment receiver includes cup dimensioned to receive the lower receiver attachment point. A latch secures the lower receiver attachment point within the cup. A handle is operable to selectively release and secure the latch about the lower receiver attachment point.

In some embodiments, a locking arm is pivotally coupled to the handle to selectively engage the lower receiver in one of a latched or an unlatched condition.

In other embodiments, casters coupled to a bottom of the tool storage compartment. A plurality of lifting points may also be disposed on a top end of the tool storage compartment.

In yet other embodiments, a slotted opening is provided at a top end of the bay. A coupling is provided at an aft side of a top end of the tool storage compartment. The coupling configured to engage with the slotted opening to prevent the tool storage compartment from tipping when received within the bay.

In other embodiments, a sensor is mounted proximal to the lower receiver attachment point. The sensor is configured to detect a latched condition of the compartment receiver. One or more of an audible and visual signal activated by the sensor.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a removable tool compartment that attaches to a service truck and is interchangeable with another compartment containing a different operator's personal tools when needed. Advantageously, the compartment includes casters on the bottom for transporting on the ground surface, and to be easily utilized off the vehicle.

Having dedicated trucks for each mechanic is a significant investment, versus having one truck for two or more mechanics on different shifts or schedules. Alternatively, having the mechanic load and unload his own tools from a shared truck is not an efficient use of time or money. Removable toolbox compartments allow the owner to have one service truck, and still have individual mechanics safely and quickly move their own tools from the truck to the fixed facility location.

Another embodiment of the present invention is a removable tool compartment that attaches to a service truck, and removes for locating the operator's tools inside the compartment closer to his working location. This reduces the number of trips the operator needs to make back to the service truck for tools.

The removable toolbox compartment can be loaded with an overhead hoist/crane, or a fork truck with the provided forklift pockets. In one embodiment, the compartment includes a "compartment not secure" light for the chassis cab, and interior compartment lighting for better tool visibility. Having casters on the bottom allows the operator to move the toolbox easily when not on the truck. The compartment is lockable so other users do not have access to the tools inside.

Referring to FIGS. 1 through 17, the present invention includes a removable and replaceable tool storage compartment apparatus including a plurality of tool storage compartments 10 and a compartment receiver 60. The tool storage compartments 10 each include a body made of a frame and a plurality of panels coupled to the frame. A closure door 120, 130 is configured to open and close an entrance to an inside of the tool storage compartment 10. At least one of the doors 120, 130 may include a locking handle 150. In certain embodiments, casters 70 are coupled to the base of the tool storage compartment. A plurality of lifting points 80 are coupled to the tool storage compartment 10 and are used to install and remove the tool storage compartments 10 from the truck 160, such as with a hoist, a crane, or a forklift. A handle 100 may be provided to facilitate movement of the tool storage compartment 10 when it is being positioned within a bay 20 of the truck 160 or it is being repositioned while rolling on the casters 70.

Figure 1:
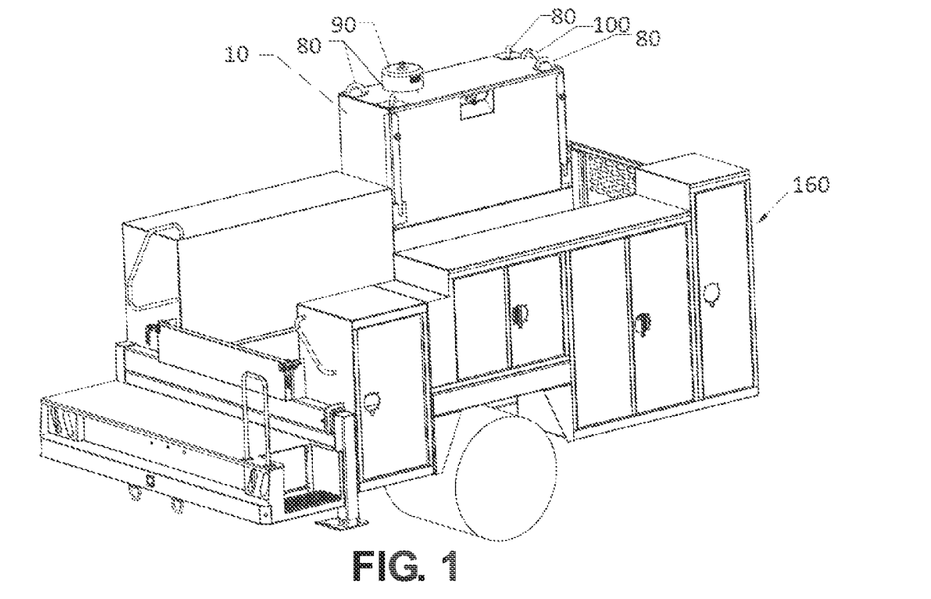
FIG. 1 Is a rear right perspective view of the removable tool storage compartment positioned for installation in a bay.
Figure 2:
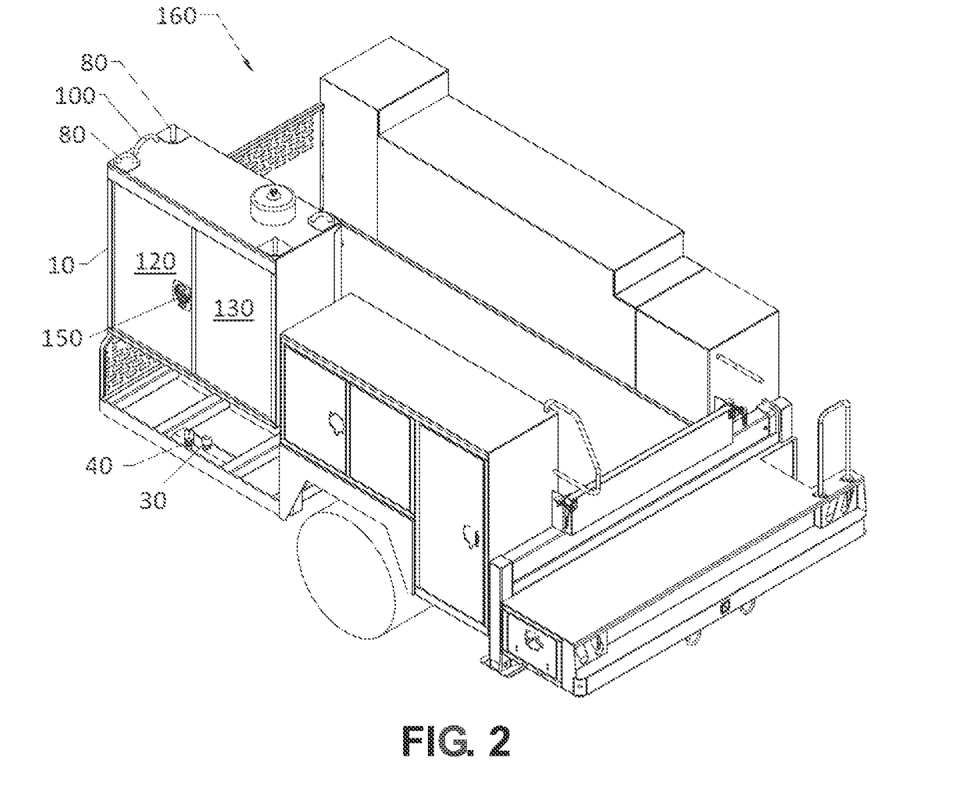
FIG. 2 is a rear left perspective view of the removable tool storage compartment positioned for installation in a bay.

The lift mounts may include lift rings 80, fork lift slots 22, or a combination thereof. The lifting rings 80 at the top and forklift slots (not shown) are used to remove or install the tool storage compartment 10 from bay 20 of the vehicle 160. Straps, cables, or chains may run through the lift rings 80.

As best seen in reference to FIGS. 11-13 and 16-18, the compartment receiver 60 is configured to removably secure to a lower receiver attachment point 30 attached to the frame of the truck 160 within the bay 20. The compartment receiver 60 engages with the lower receiver attachment point 30 to retain each of the tool storage compartments 10 in the bay 20. The receiver 60 includes a handle 64 that is operable to uncouple the receiver 60 from the lower receiver attachment point 30 that is received within a receiver cup 65. The handle is operably coupled to a latch 68 that engages with the lower receiver attachment point 30 when carried within the cup. A locking arm 62 is pivotally coupled to the handle 64 to retain the receiver 60 in a locked condition about the lower receiver attachment point 30. The handle 64 and locking arm 62 are attached via pivot pins 66 or bolts. Rotation of the handle 64 allows the receiver 60 to decouple from the lower receiver attachment point 30. The locking arm 62 may be positioned to retain the handle 64 in the released condition.

Figure 16:
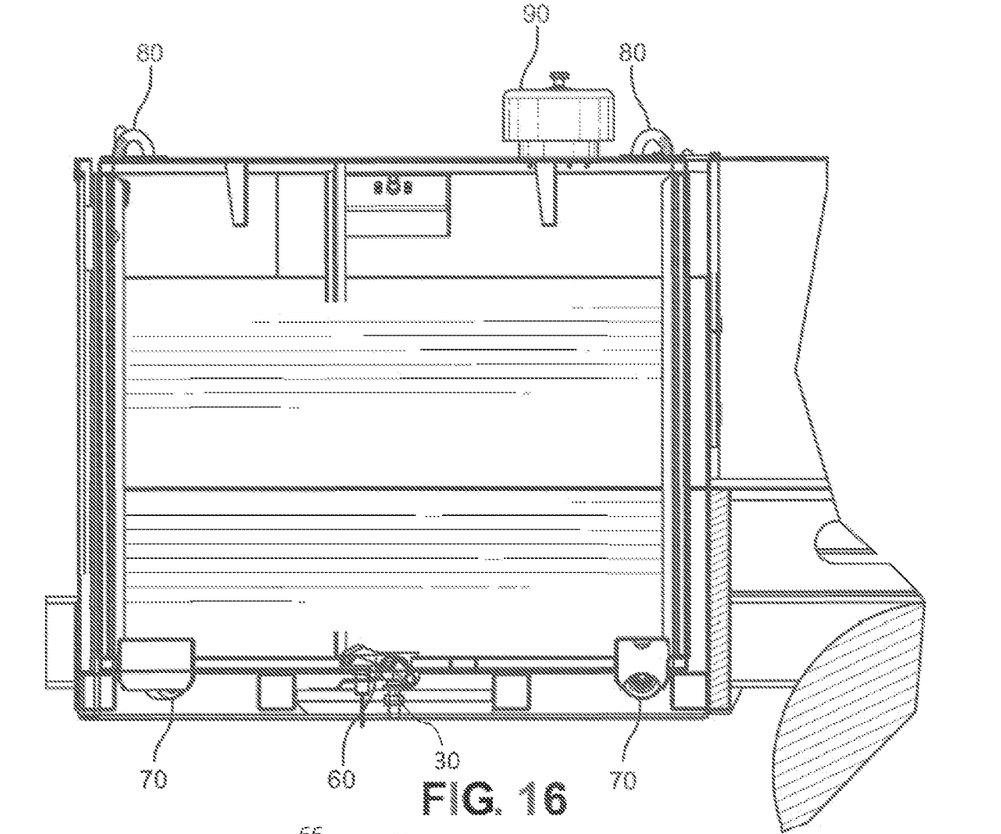
FIG. 16 shows a sectional view of the removable tool storage compartment in a stowed position.
Figure 17:
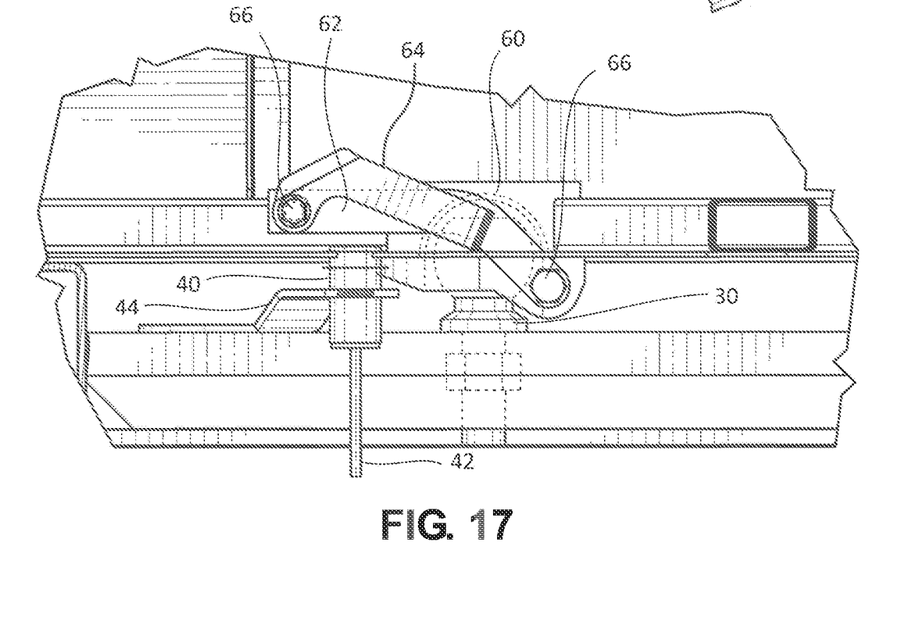
FIG. 17 shows a detail side elevation view of the receiver and a stow sensor for the removable tool storage compartment shown in a stowed and latched condition.
Figure 18:
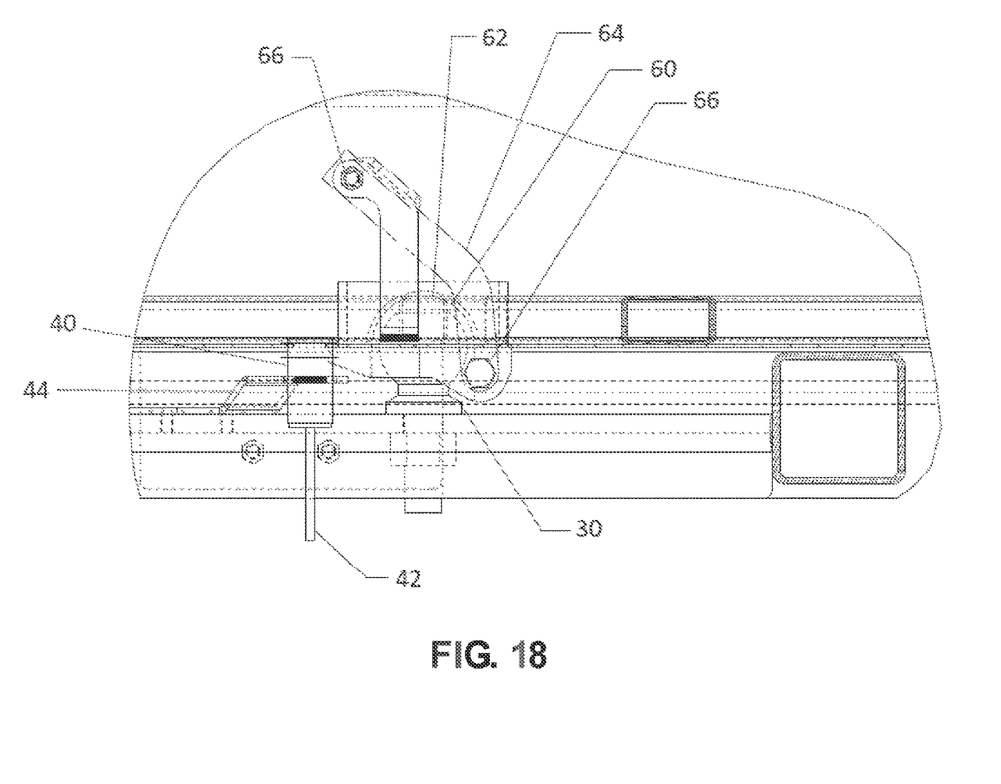
FIG. 18 shows a detail side elevation view of the receiver and a stow sensor for the removable tool storage compartment shown in a stowed and unlatched condition.

As best seen in reference to FIGS. 16-18, a sensor 40 is provided to sense the condition of the handle 64 in the locked condition about the lower receiver attachment point 30. A sensor wire 42 communicates the locked condition of the receiver 60, and may provide a visual or an audible signal to the operator in the cab of the truck 150. The sensor 40 is mounted to a bracket 44 proximal to the lower receiver attachment point 30.

Figure 3:
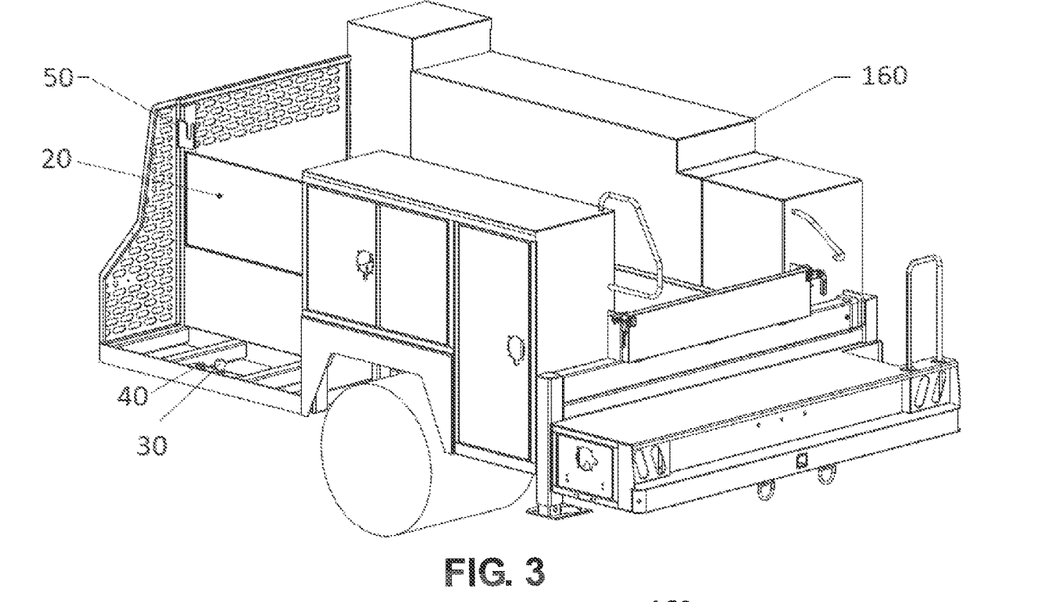
FIG. 3 is a rear left perspective view of the removable tool storage compartment bay, with the removable tool storage compartment removed.
Figure 4:
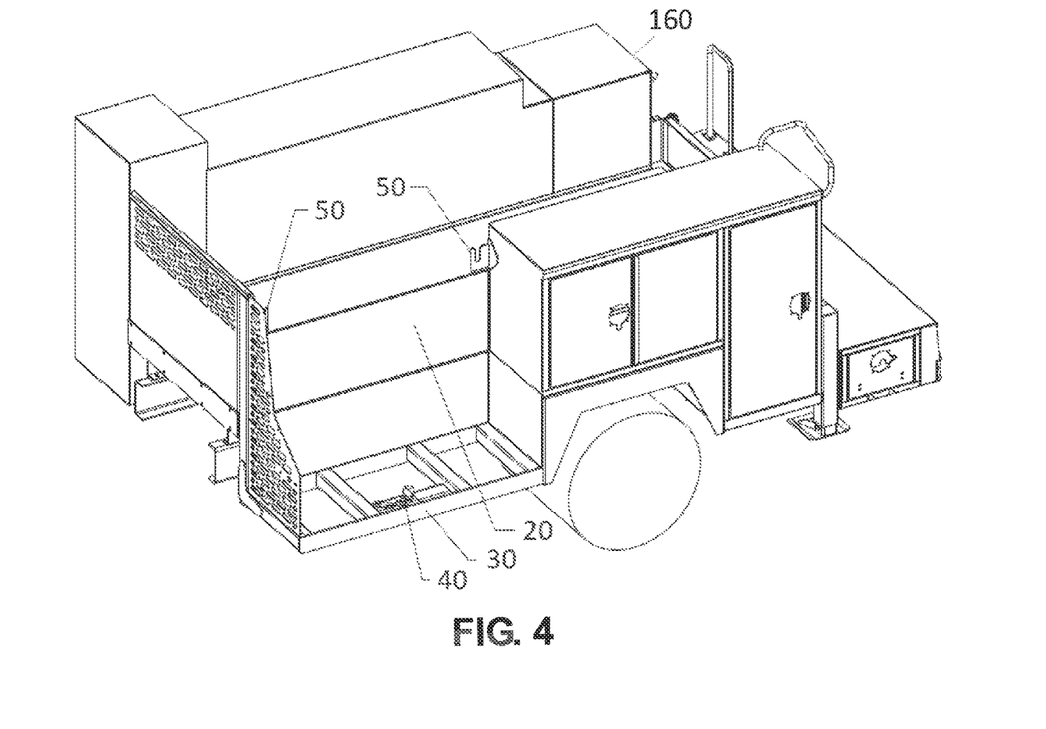
FIG. 4 is a front left perspective view of the removable tool storage compartment bay, with the removable tool storage compartment removed.
Figure 5:
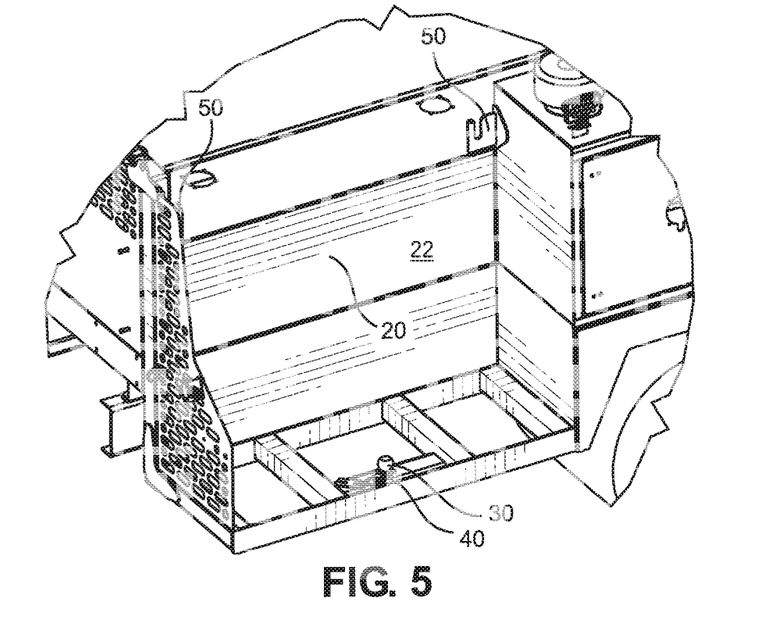
FIG. 5 is a close up upper perspective view of the storage compartment bay area.
Figure 6:
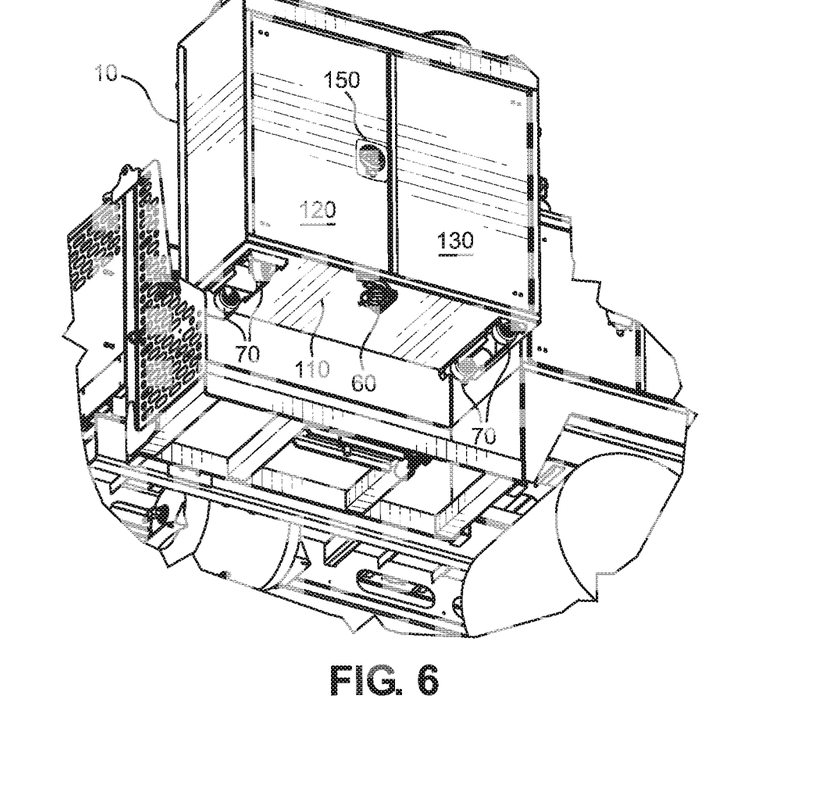
FIG. 6 is a close up lower perspective view of the bottom of the storage compartment bay, and bottom of the removable tool storage compartment.
Figure 7:
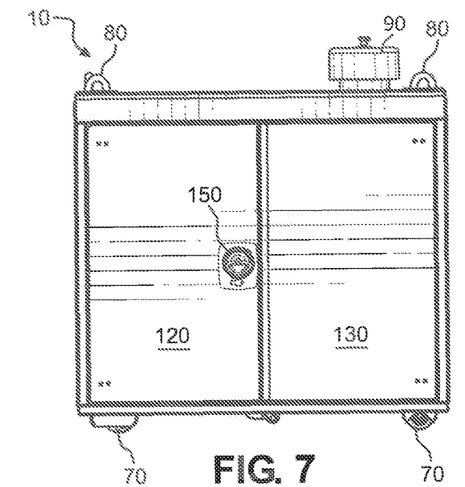
FIG. 7 is a front elevation view of the removable tool storage compartment in isolation.
Figure 8:
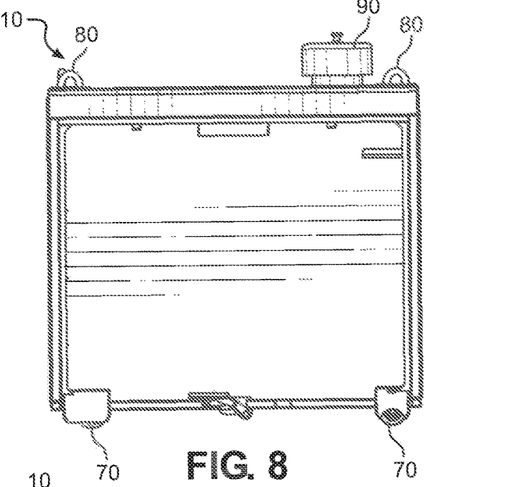
FIG. 8 is a front elevation cut away view of the removable tool storage compartment without doors shown.
Figure 9:
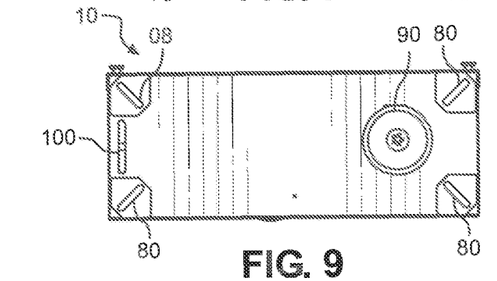
FIG. 9 is a top plan view of the storage compartment in isolation.
Figure 10:
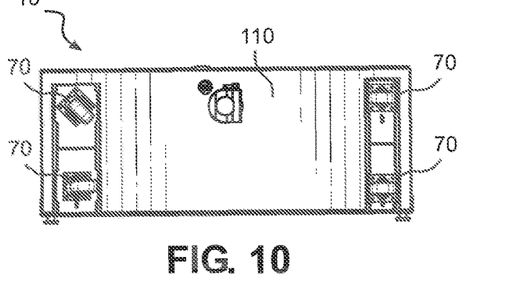
FIG. 10 is a bottom plan view of the storage compartment in isolation.
Figure 11:
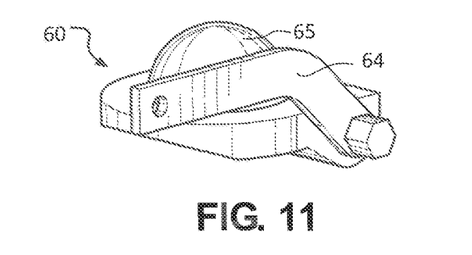
FIG. 11 is close-up perspective view of the removable compartment receiver lock.
Figure 12:
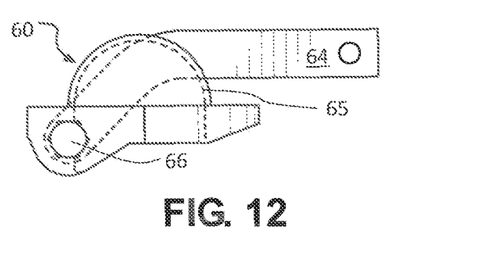
FIG. 12 is a close-up side elevation view of the removable compartment receiver lock.
Figure 13:
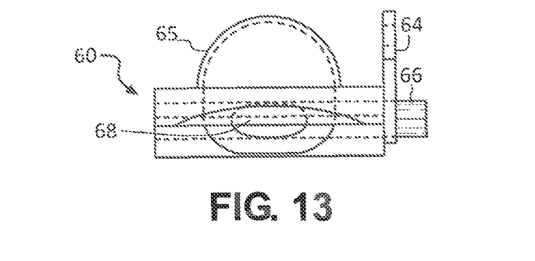
FIG. 13 is a close-up front elevation view of is the removable compartment receiver lock.
Figure 14:
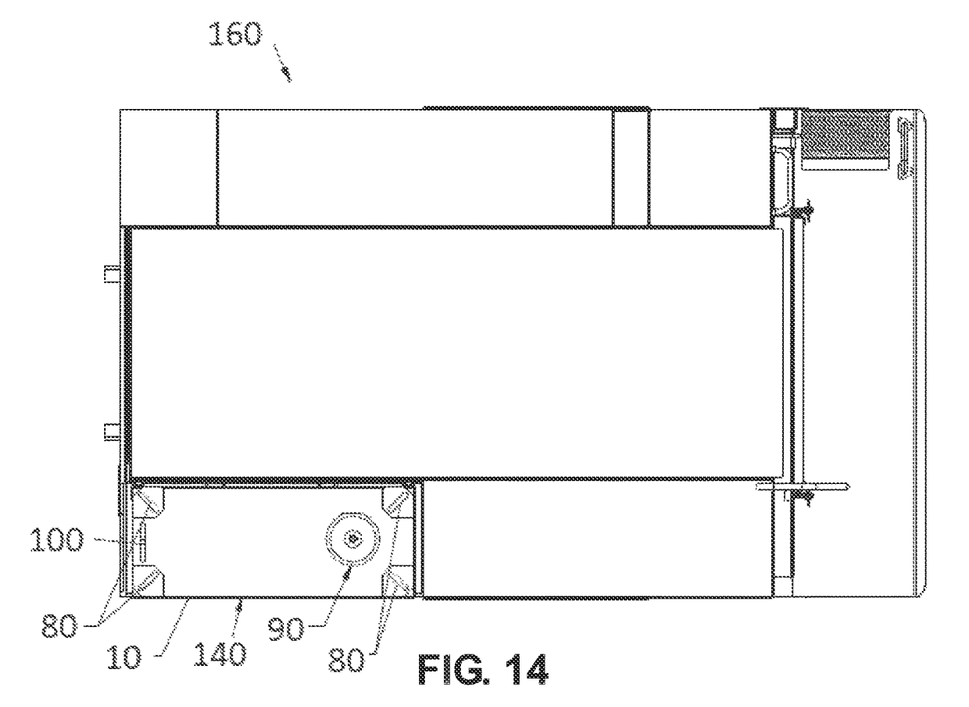
FIG. 14 is a top plan view of the removable tool storage compartment in use in a stowed position on truck.
Figure 15:
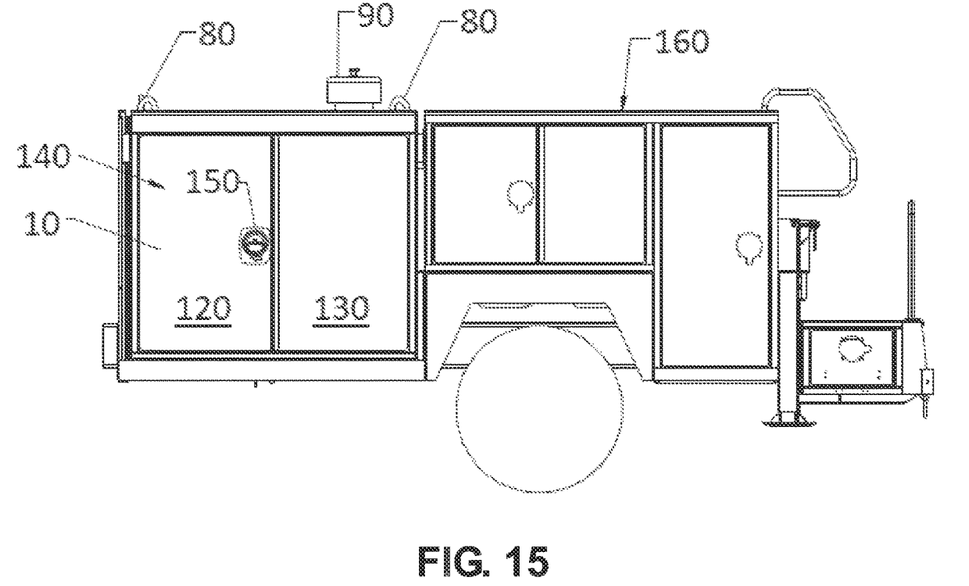
FIG. 15 is a front elevation view of the removable tool storage compartment in use in a stowed position on truck.

Referring to FIGS. 3-5 the back panel 22 of the bay 20 may include a slotted opening 50 at a top end of the bay 20. The slot opening 50 is configured to engage a coupling attached to an aft top end of the removable storage compartment 10. The coupling may include a pin, a post, or a pocket defined at a and aft side of the top end of the tool storage compartment 10 to prevent the tool storage compartment 10 from tipping within the bay 20. The tool storage compartments 10 can be connected to a power source to operate any lighting or other powered feature in the tool storage compartments 10. In one embodiment, the tool storage compartments 10 includes a sensor interface 40 to alert the driver if the tool storage compartments 10 is not properly stowed.

In one embodiment of use, the service truck 160 is loaded with company owned equipment in the remainder of the truck's compartments. The removable toolbox compartment 10 is loaded with the mechanic's personal tools. A second identical compartment 10' may be loaded with another mechanics personal tools. When the first mechanic is on shift, he uses an overhead lift or fork truck to load the first removable toolbox compartment 10, locking it to the service truck 160 with the compartment receiver 60 and lower receiver attachment point 30. The second removable compartment 10' may be stored in a fixed facility for the mechanic to utilize. When the first mechanic's shift is done, he removes the compartment 10 from the truck 160 and places it on the ground to be used in the fixed facility, transporting by its own casters 70. The second mechanic then loads the second removable tool compartment 10' onto the service truck 160. In alternative embodiments, the compartment 10, 10' is installed in other applications like boats, barges, the back of a pickup truck, or on a flatbed trailer.

In one embodiment of use, the service truck 160 is loaded with job specific equipment carried in the removable toolbox compartment 10. Another removable compartment 10' is loaded with tools and equipment for another job specific task. The compartments 10, 10' can be easily exchanged to facilitate utilization of the same service truck 160 to perform the different job specific tasks.

The storage compartment 10, 10' may be equipped with an optional Pressurized Storage system (PSS) 90 that provides pressurized and filtered air to the interior of the compartment. The PSS system keeps out dust and moisture when driving down the road as described in U.S. Patent No. 8,202,145 incorporated herein by reference.

It should be understood, of course, that the foregoing relates to exemplary embodiments of the invention and that modifications may be made without departing from the spirit and scope of the invention as set forth in the following claims.

What is claimed is:

1. A removable and replaceable tool storage compartment, comprising:
   a tool storage compartment comprising:
   a body;
   a closure coupled to the body and configured to open and close an entrance to an interior of the tool storage compartment; and
   a compartment receiver disposed on a bottom surface of the tool storage compartment, configured to couple to a lower receiver attachment point mounted within a bottom of a bay of a service truck as a ball and a cup coupling, the bay dimensioned to contain the tool storage compartment therein.

2. The removable and replaceable tool storage compartment of claim 1, wherein the compartment receiver further comprises:
   the cup mounted on a bottom face of the tool storage compartment and dimensioned to receive the ball of the lower receiver attachment point;
   a latch to secure the ball of the lower receiver attachment point within the cup; and
   a handle operable to selectively release and secure the latch about the ball of the lower receiver attachment point.

3. The removable and replaceable tool storage compartment of claim 2, further comprising:
   a locking arm pivotally coupled to the handle to selectively engage the latch in one of a latched or an unlatched condition.

4. The removable and replaceable tool storage compartment of claim 1, further comprising casters coupled to a bottom of the tool storage compartment.

5. The removable and replaceable tool storage compartment of claim 4, further comprising:
   a plurality of lifting points disposed on a top end of the tool storage compartment.

6. The removable and replaceable tool storage compartment of claim 5, further comprising:
   a coupling at an aft side of the top end of the tool storage compartment, the coupling configured to engage with a slotted opening at a top end of the bay to prevent the tool storage compartment from tipping when received within the bay.

7. A service vehicle adapted to receive a removable storage compartment, comprising:
   a bay dimensioned to receive the removable storage compartment;
   a lower receiver attachment point comprising a ball mounted within a bottom of the bay; and,
   a compartment receiver attached to a bottom end of the removable storage compartment, the compartment receiver operable to selectively retain the ball of the lower receiver attachment point within a cup of the compartment receiver.

8. The service vehicle of claim 7, wherein the compartment receiver further comprises:
   the cup dimensioned to receive the ball of the lower receiver attachment point;
   a latch to secure the ball of the lower receiver attachment point within the cup; and
   a handle operable to selectively release and secure the latch about the ball of the lower receiver attachment point.

9. The service vehicle of claim 8, further comprising:
   a locking arm pivotally coupled to the handle to selectively engage the lower receiver in one of a latched or an unlatched condition.

10. The service vehicle of claim 7, further comprising casters coupled to a bottom of the storage compartment.

11. The service vehicle of claim 7, further comprising:
    a plurality of lifting points disposed on a top end of the storage compartment.

12. The service vehicle of claim 7, further comprising:
    a slotted opening at a top end of the bay; and
    a coupling at an aft side of a top end of the storage compartment, the coupling configured to engage with the slotted opening to prevent the storage compartment from tipping when received within the bay.

13. The service vehicle of claim 7, further comprising:
    a sensor mounted proximal to the lower receiver attachment point, the sensor configured to detect a latched condition of the compartment receiver.

14. The service vehicle of claim 13, further comprising:
    one or more of an audible and visual signal activated by the sensor.

15. The service vehicle of claim 7, further comprising:
    a first removable storage compartment configured to contain a first set of tools for a first specified maintenance activity.

16. The service vehicle of claim 15, further comprising:
    a second removable storage compartment configured to contain a second set of tools for second specified maintenance activity.

17. The service vehicle of claim 16, further comprising:
    selectively installing one of the first removable storage compartments and the second removable storage compartment to configure the service vehicle for one of the first specified maintenance activity or the second specified maintenance activity.

* * * * *